United States Patent [19]
Sem

[11] Patent Number: 5,462,658
[45] Date of Patent: Oct. 31, 1995

[54] FUEL FILTER SYSTEM

[75] Inventor: Thomas R. Sem, Plymouth, Minn.

[73] Assignee: Thermo King Corporation, Minneapolis, Minn.

[21] Appl. No.: 182,915

[22] Filed: Jan. 14, 1994

[51] Int. Cl.⁶ .................................................. B01D 35/01
[52] U.S. Cl. ...................... 210/172; 210/312; 210/433.1; 210/436; 210/438; 210/440; 210/444
[58] Field of Search .................................... 210/172, 188, 210/312, 433.1, 436, 438, 440, 444, DIG. 17

[56] References Cited

U.S. PATENT DOCUMENTS

| | | | |
|---|---|---|---|
| 2,997,180 | 8/1961 | Loveday | 210/436 |
| 4,157,082 | 6/1979 | Day | 210/312 |
| 4,491,120 | 1/1985 | Hodgkins | 123/557 |
| 4,512,884 | 4/1985 | Wheatley | 210/438 |
| 4,618,423 | 10/1986 | Hodgkins | 210/305 |

FOREIGN PATENT DOCUMENTS 945477  4/1974  Canada .

*Primary Examiner*—Matthew O. Savage

[57] ABSTRACT

A fuel filter system for conditioning fuel flowing from fuel supply means to an internal combustion engine, comprising a fuel filter head having a contaminant outlet port, and fuel inlet and fuel outlet ports respectively adapted for connection to the fuel supply means and to the internal combustion engine. The fuel filter system further includes a fuel filter cartridge having a filter element, with the fuel filter cartridge having an upper portion releaseably secured to a lower portion of the fuel filter head, defining fuel inlet and fuel outlet chambers which direct fuel from the fuel inlet port and fuel inlet chamber through the filter element to the fuel outlet chamber and fuel outlet port of the fuel filter head. A liquid bleed tube extends between the fuel filter head and the fuel filter cartridge, and a fluid flow conduit connects the bleed tube in fluid flow communication with the contaminant outlet port. An air bleed passageway in the fuel filter head connects an upper portion of the fuel filter cartridge to the fluid flow conduit which connects the bleed tube to the contaminant outlet port. Water, air, and other fuel contaminants separated from fuel in the fuel filter cartridge are continuously removed via the liquid bleed tube and air bleed passageway and delivered to the contaminant outlet port of the fuel filter head during operation of the internal combustion engine.

13 Claims, 5 Drawing Sheets

FUEL FILTER SYSTEM

TECHNICAL FIELD

The invention relates to fuel filter systems for conditioning liquid fuel, including the separation of contaminants, such as air, foreign particles and water, from fuel in a fuel supply system of an internal combustion engine.

BACKGROUND ART

A fuel filter system for conditioning the fuel of an internal combustion engine, such as a diesel engine, should separate air and water from fuel at a point between the fuel supply tank and the engine. Air is less dense than the fuel, and water is more dense than the fuel. Thus, air must be removed from an upper portion of the fuel filter system, and water must be removed from a lower portion of the fuel filter system. These requirements have resulted in special fittings being provided on the filter cartridge of a fuel filter system, including a fitting adjacent to an upper portion of the fuel filter cartridge for bleeding air, and/or a fitting near a lower portion of the filter cartridge for draining water which collects in a lower sump portion of the filter cartridge. A fitting adds manufacturing cost to the fuel filter cartridge; a fitting requires hose material to be routed to the fuel filter cartridge; and, a fitting increases the service time required to change a fuel filter cartridge.

Thus, it would be desirable, and it is an object of the present invention, to provide a fuel filter system having a fuel filter head and a fuel filter cartridge, which continuously removes water and particulates from liquid fuel and returns the contaminated liquid to a fuel tank, during operation of an associated internal combustion engine, without requiring an external fitting on the fuel filter cartridge.

It is another object of the invention to provide a fuel filter system having a fuel filter head and a fuel filter cartridge, which continuously removes air from liquid fuel, during operation of an associated internal combustion engine, without requiring an external fitting on the fuel filter cartridge.

SUMMARY OF THE INVENTION

Briefly, the present invention is a fuel filter system for conditioning liquid fuel flowing from fuel supply means to an internal combustion engine. The fuel filter system continuously removes air and water from the liquid fuel during operation of the internal combustion engine without requiring an external fitting on a throw-away fuel filter cartridge. The fuel filter system comprises a fuel filter head having fuel inlet and fuel outlet ports respectively adapted for connection to the fuel supply means and to the internal combustion engine, and a fuel filter cartridge having a filter element. The fuel filter cartridge has an upper portion releaseably secured to a lower portion of the fuel filter head, with the fuel filter head and fuel filter cartridge defining fuel inlet and fuel outlet chambers which direct fuel from the fuel inlet port and fuel inlet chamber through the filter element to the fuel outlet chamber and fuel outlet port of the fuel filter head.

The fuel filter head defines a contaminant outlet port, and bleed tube means is provided. The bleed tube means extends between the fuel filter head and the fuel filter cartridge. Means connects the bleed tube means in fluid flow communication with the contaminant outlet port.

The bleed tube means is located within the fuel filter cartridge such that water and other fuel contaminants in the fuel filter cartridge are continuously removed via the bleed tube means and delivered to the contaminant outlet port of the fuel filter head during operation of the internal combustion engine. Air separated from fuel in the fuel filter cartridge joins liquid flowing to the contaminant outlet port via an air bleed passageway in the fuel filter head.

In a preferred embodiment of the invention the bleed tube means includes a tubular member having first and second ends and inner and outer surfaces which extend between the ends. The first end is fixed to the fuel filter head and the second end extends into the fuel filter cartridge. An internal seal is provided in the fuel filter cartridge which forms a liquid seal about the outer surface of the tubular member which prevents conditioned fuel from becoming re-contaminated.

BRIEF DESCRIPTION OF THE DRAWINGS

The invention will become more apparent by reading the following detailed description in conjunction with the drawings, which are shown by way of example only, wherein.

DESCRIPTION OF PREFERRED EMBODIMENTS

Figure 1:
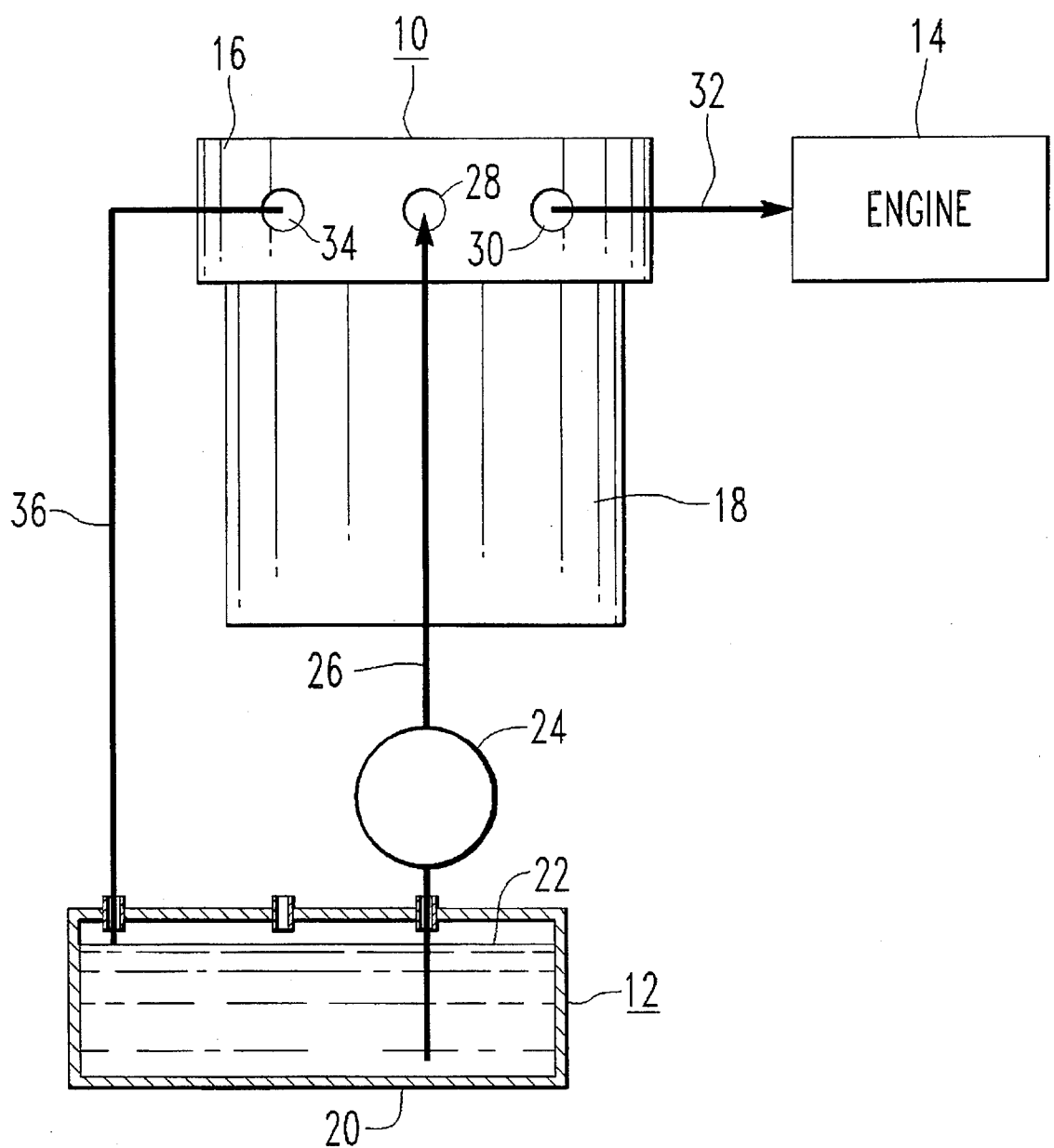
FIG. 1 is a block diagram of a fuel filter system connected between a fuel supply and an internal combustion engine which may be constructed according to the teachings of the invention.

Referring now to the drawings, and to FIG. 1 in particular, there is shown a fuel filter system 10 which may be constructed according to the teachings of the invention. Fuel filter system 10 is disposed between fuel supply means 12 and an internal combustion engine 14, such as a diesel engine. Fuel filter system 10 includes a fuel filter head 16 and a disposable fuel filter cartridge 18. The fuel filter cartridge 18 is releaseably secured to the fuel filter head 16. For example, fuel filter cartridge 18 may be a "spin-on" type, having a threaded bore for threadably engaging a threaded boss on the fuel filter head.

Fuel supply means 12, which includes a vented tank 20 containing a liquid fuel 22, such as diesel fuel, is connected to provide fuel 22 via a fuel transfer pump 24 and a fuel line 26 to a fuel inlet port 28 on the fuel filter head 16. Fuel 22 is conditioned in fuel filter cartridge 18, and conditioned fuel is delivered to a fuel outlet port 30. Fuel 22 is then directed to engine 14 via a fuel line 32, such as to a fuel injection pump, when engine 14 is a diesel engine.

According to the teachings of the invention, a contaminant outlet port 34 is provided on fuel filter head 16. Air, water, and other contaminants in fuel 22 are continuously separated from fuel 22 in fuel filter cartridge 18, during operation of engine 14, and delivered to the contaminant outlet port 34. It is important to note that the fuel contaminants are not merely stored in a sump in fuel filter cartridge 18 for periodic removal, but that the fuel contaminants are removed on a continuous basis during operation of engine 14.

As illustrated in FIG. 1, the contaminants may be returned to fuel tank 20 via a return line 36 connected between contaminant outlet port 34 and tank 20; or, the contaminants may be connected to a separate storage tank, as desired. In fuel supply arrangements in which excess fuel is continuously returned to fuel supply tank 20 during operation of engine 14, such as in a diesel engine arrangement, the fuel contaminants may be combined with the excess fuel and returned to tank 20 via a single return line 36.

Figure 2:
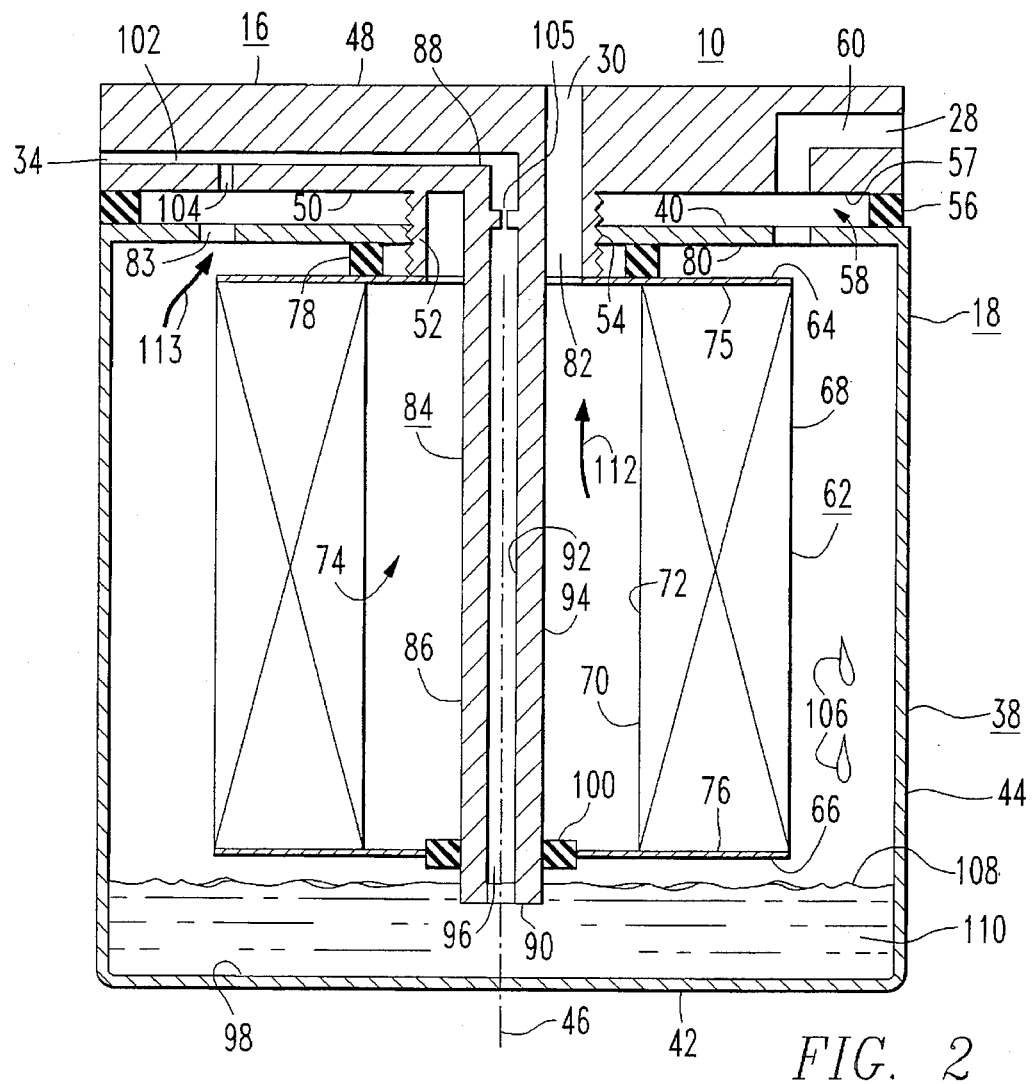
FIG. 2 is a diagrammatic sectional view of a fuel filter system having a fuel filter head and a fuel filter cartridge constructed according to the teachings of the invention.

FIG. 2 is a diagrammatic cross sectional view of fuel filter system 10 shown in FIG. 1, illustrating the principles of the invention. Fuel filter cartridge 18 includes a housing 38 having first and second ends 40 and 42, respectively, a side wall 44, which may be cylindrical, and a longitudinal axis 46 which extends between the first and second ends 40 and 42. Fuel filter head 16 has upper and lower sides or portions 48 and 50, referred to as being "upper" and "lower" portions 48 and 50 as fuel filter head 16 is mounted in an orientation such that the first end 40 of fuel filter cartridge 18 is releaseably secured to the lower portion 50 of fuel filter head 48, with the longitudinal axis 46 of fuel filter cartridge 18 being substantially vertically oriented.

The lower portion 50 of fuel filter head 16 includes a hollow, externally threaded, depending boss 52 and the first end 40 of fuel filter cartridge 18 has a complementary threaded bore 54 which enables fuel filter cartridge 18 to be "spun" on to fuel filter head 16 until an annular resilient sealing member 56 fixed to the first end 40 of the fuel filter cartridge 18 contacts a flat bearing surface 57 of the lower portion 50 to provide a liquid seal between the fuel filter cartridge 18 and fuel filter head 16.

When fuel filter cartridge 18 is assembled with fuel filter head 16 they cooperatively form a fuel inlet chamber 58 between the lower portion 50 of fuel filter head 16 and the first end 40 of fuel filter cartridge 18. A passageway 60 in fuel filter head 16 interconnects fuel inlet port 28 with the fuel inlet chamber 58.

A cylindrical, tubular, liquid permeable fuel filter element 62, which is treated to coalesce and concentrate water contained in fuel 22, is mounted within housing 38, with fuel filter element 62 having first and second ends 64 and 66, respectively, an outer surface 68, and an inner surface 70 which defines a central opening 72 which extends between the first and second ends 64 and 66. A longitudinal axis which extends between the first and second ends 64 and 66 is coaxial with the longitudinal axis 46 of housing 38.

First and second end cap members 75 and 76 respectively seal the first and second ends 64 and 66 of filter element 62. An annular resilient sealing member 78 forms a liquid seal between the first end cap member 75 and an inner surface 80 of the first housing end 40. A passageway 82 in filter head 16 extends in fluid flow communication between central opening 72 and fuel outlet port 30. Thus, central opening 72 defines a conditioned fuel outlet chamber 74, with passageway 82 thus providing conditioned fuel to fuel outlet port 30. Openings 83 in the first end 40 of housing 38 enable fuel in fuel inlet chamber 58 to flow downwardly and effectively expand the fuel inlet chamber 58 to include the volume surrounding the outer, fuel inlet surface 68 of filter element 62.

According to the teachings of the invention, liquid bleed tube means 84 is provided which extends between the fuel filter head 16 and the fuel filter cartridge 18. Liquid bleed tube means 84 includes a hollow, elongated tubular member 86 having first and second ends 88 and 90, respectively, and inner and outer surfaces 92 and 94, respectively. Inner surface 92 defines an opening 96 which extends between the first and second ends 88 and 90. The first end 88 is fixed to the fuel filter head 16. Tubular member 86 depends from fuel filter head 16, with the longitudinal axis of tubular member 86 being substantially perpendicularly oriented. The longitudinal axis of tubular member 86 is coaxial with the longitudinal axis 46 of fuel filter cartridge 18 when fuel filter cartridge 18 is assembled with fuel filter head 16, and thus tubular member 86 is centered in central opening 72. Tubular member 86 is dimensioned lengthwise to dispose the second end 90 closely adjacent to, but spaced from, an inner bottom surface 98 located at the second housing end 42 of fuel filter cartridge 18, when fuel filter cartridge 18 is assembled with fuel filter head 16.

A liquid seal in the form of an annular, resilient member 100 is provided between the outer surface 94 of tubular member 86 and the filter element 62, at a lower end of fuel outlet chamber 74, such as between the lower end cap 76 and outer surface 94, adjacent to the second end 90 of tubular member 86.

A passageway 102 is provided in fuel filter head 16 which connects the central opening 96 at the first end 88 of tubular member 86 in fluid flow communication with the contaminant outlet port 34. A small air bleed passageway 104 in fuel filter head 16 interconnects passageway 102 and surface 57 at the lower portion 50 of fuel filter head 16. As hereinbefore stated, surface 57 and the lower portion 50 of fuel filter head 16 are in fluid flow communication with fuel inlet chamber 58. Thus, air bleed passageway 104 provides a path for continuous removal of air separated from fuel 22 in fuel filter cartridge 18 during operation of engine 14.

The rate at which liquid, eg., water and fuel mixture, is delivered to contaminant outlet port 34 is restricted in order to provide a positive supply pressure of filtered and conditioned fuel at fuel outlet port 30. This may be accomplished, for example, by providing an orifice 105 in the flow path which includes opening 96 and passageway 102, and by dimensioning passageway 104 to function as a flow rate limiting orifice. Suitable dimensions for passageway 104 and orifice 105 are 0.030 inch (0.8 mm) for each. A single flow rate limiting orifice located in passageway 102, downstream from the intersection of passageway 104 with passageway 102, would also be suitable. Also, instead of providing one or more discrete flow restricting orifices, the lengths and diameters of the flow paths defined by opening 96, passageway 102 and passageway 104 may all be selected to provide the required positive pressure at the fuel outlet port 30.

During the operation of engine 14, fuel 22 is forced by fuel transfer pump 24 to flow into fuel inlet port 28, passageway 60, and fuel inlet chamber 58 to surround the fuel input surface 68 of liquid permeable filter element 62.

Water droplets 106 in fuel 22 immediately separate from the fuel due to the higher specific gravity of water than fuel 22, to form a water-fuel demarcation line 108 which results in a water zone 110 adjacent to the second end 42 and inner bottom surface 98 of housing 38. Particulates in fuel 22 also drop into the water zone 110. Fuel 22 flows through the media of filter element 62, with the water coalescing treatment thereof concentrating any water still left in fuel 22, causing the heavier water to move downwardly through filter element 62 and through the less dense fuel 22 to the water zone 110. Thus, conditioned fuel, indicated by arrow 112, leaves the inner surface 70 of filter element and flows into the fuel outlet chamber 74 defined by opening 72 and passageway 82, to exit fuel filter head 16 at the fuel outlet port 30.

Fuel pressure causes water 106 in water zone 110, any fuel 22 which may be below the second end 90 of tubular member 86, and particulates entrained therein, to enter opening 96 at the second end 90 of tubular member. The contaminated liquid flows to the contaminant outlet port 34 via passageway 102, and thus to fuel supply tank 12, or some other storage tank, on a continuous basis, while engine 14 is operating.

Air, indicated by arrow 113, entrained in fuel 22 and separated therefrom within filter cartridge 18, being less dense than fuel 22, will rise into the fuel inlet chamber 58 through openings 83. The small air bleed passageway 104 enables air to escape chamber 58 and flow upwardly to join the contaminated liquid flowing through passageway 102 to the contaminant outlet port 34. Thus, both air and water in fuel 22 are removed via the contaminant outlet port 34 of the fuel filter head 16. No external fittings are required on fuel filter cartridge 18.

The only modification required in the construction of fuel filter cartridge 38 from a conventional spin-on fuel filter cartridge, other than the elimination of external fittings, is the provision of annular sealing member 100. Tubular member 86 is guided through the opening in annular sealing member 100 during the "spin" assembly of fuel filter cartridge 18 with fuel filter head 16. Proper guidance is assured by preventing any contact between end 90 of tubular member 86 and annular sealing member 100 until proper initial threadable coupling is achieved between fuel filter cartridge 18 and fuel filter head 16. The threaded bore 54 first engages the threaded boss 52 to properly orient fuel filter cartridge 18 relative to fuel filter head 16. This initial threadable engagement properly orients tubular member with the opening in annular sealing member 100, before end 90 of tubular member 86 engages sealing member 100. A slight interference fit between the outside diameter of tubular member 86 and the diameter of the opening in sealing member 100, provides a liquid seal which prevents contaminated liquid from flowing upwardly from water zone 110, along the outer surface 94 of tubular member 86, into the conditioned fuel outlet chamber 74.

Figure 5:
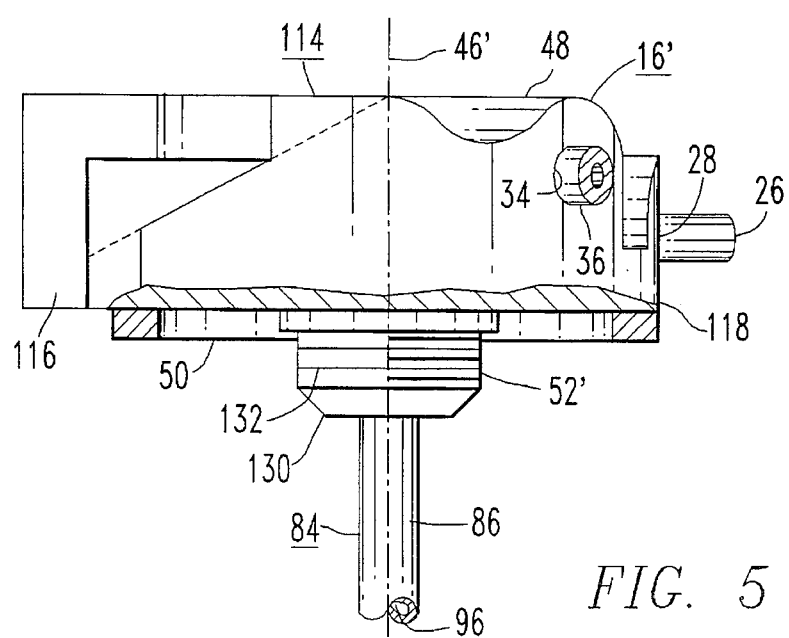
FIG. 5 is a side elevational view of the fuel filter head shown in FIG. 3.
Figure 3:
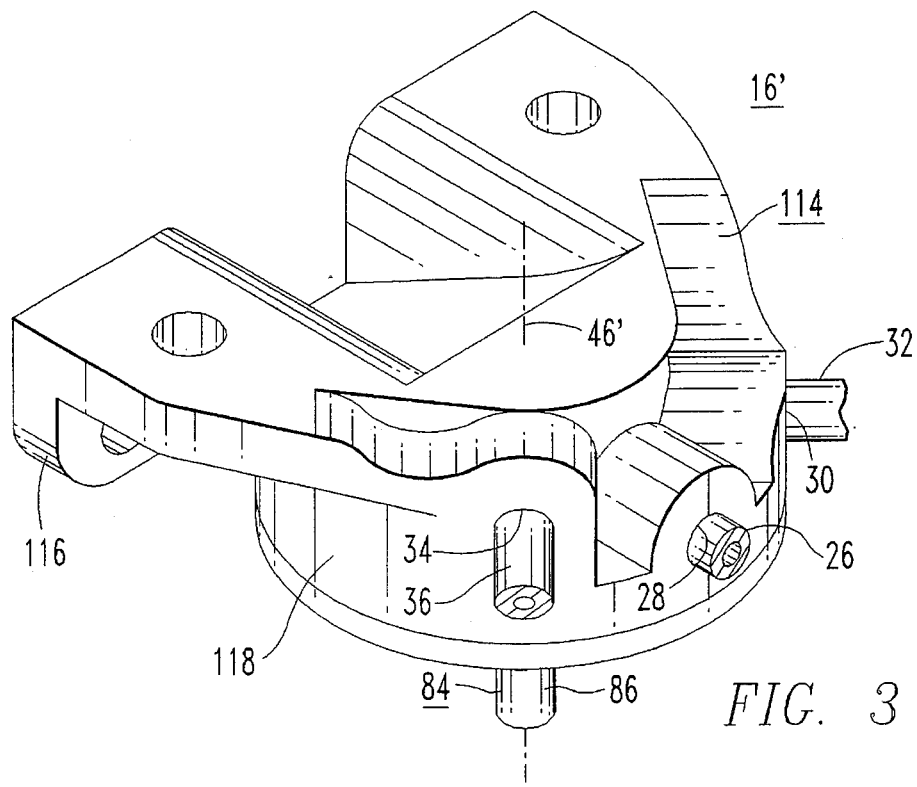
FIG. 3 is a perspective view of a fuel filter head constructed according to a preferred embodiment of the invention, which may be used for the fuel filter head shown diagrammatically in FIG. 2.
Figure 4:
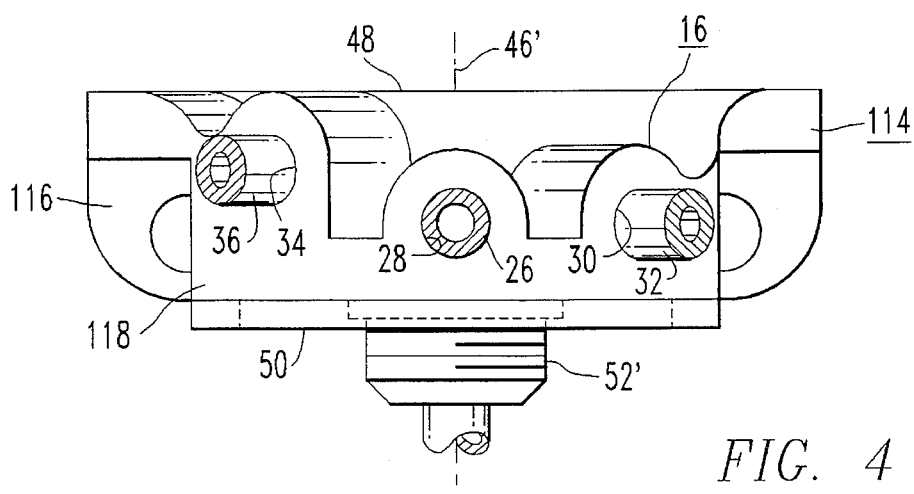
FIG. 4 is a front elevational view of the fuel filter head shown in FIG. 3.
Figure 6:
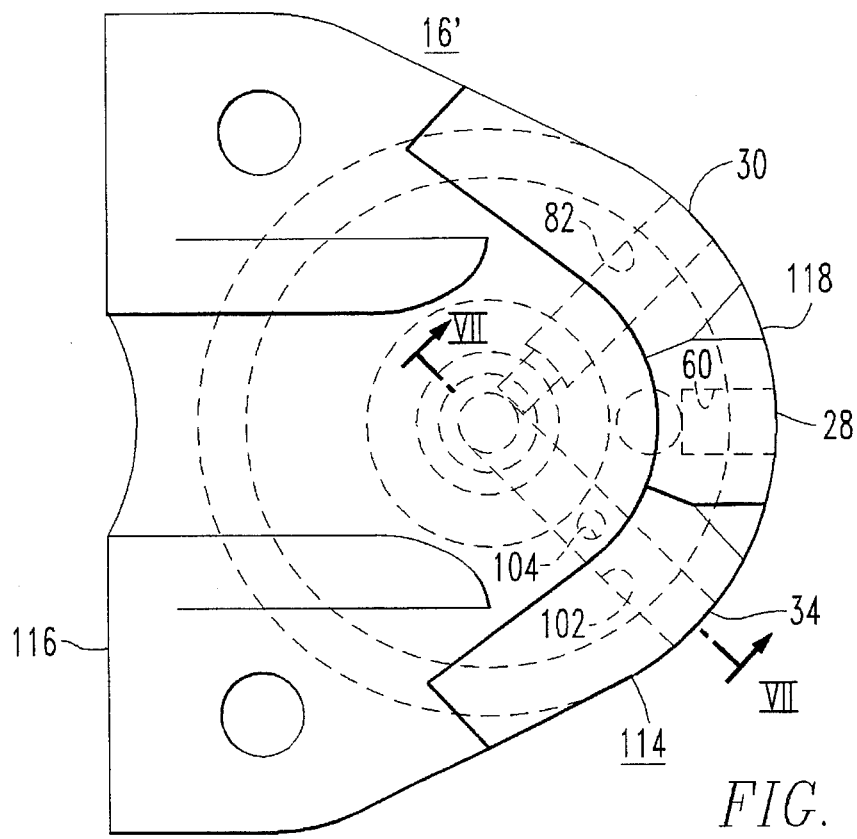
FIG. 6 is a plan view of the fuel filter head shown in FIG. 3.
Figure 8:
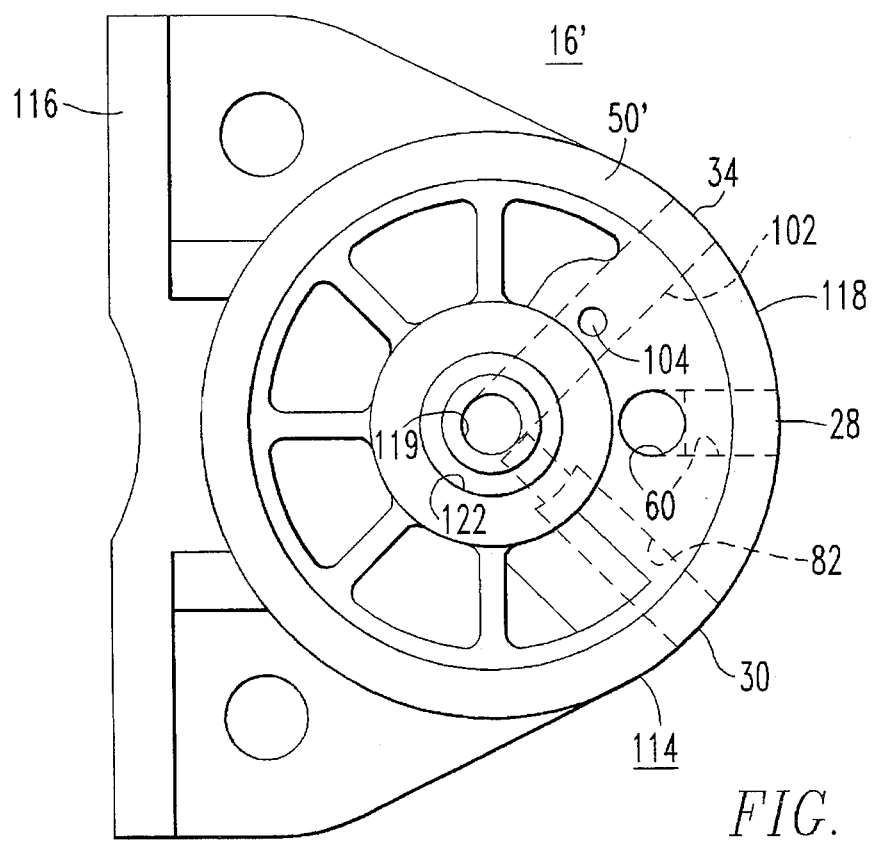
FIG. 8 is a bottom view of the fuel filter head shown in FIG. 3.

FIG. 3 is a perspective view of a fuel filter head 16' constructed according to a preferred embodiment of the invention. FIGS. 4 and 5 are front and side elevational views of fuel filter head 16', and FIGS. 6 and 8 are plan and bottom views, respectively, of fuel filter head 16'. Components of the preferred embodiment of filter head 16' which are the same as the components already described relative to the diagrammatic embodiment of fuel filter head 16 will be identified with like reference numbers. Similar but modified components will be identified with like reference numbers with the addition of a prime mark.

Figure 7:
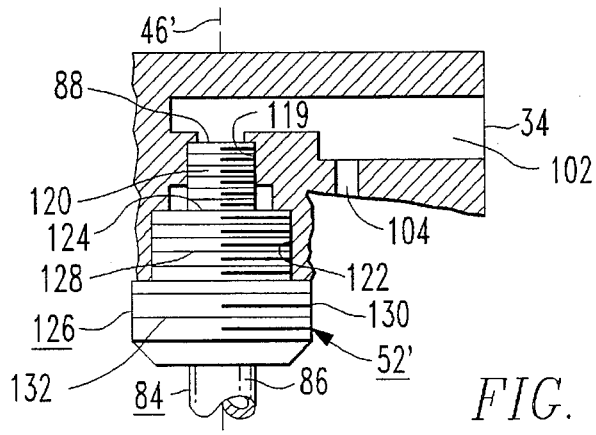
FIG. 7 is a fragmentary cross-sectional view of the fuel filter head shown in FIG. 6, taken between and in the direction of arrows VII—VII.

Filter head 16' includes a metallic body portion 114, which may be cast of a metal, such as aluminum, for example. Metallic body portion includes a mounting flange 116 and a main body portion 118 which includes the fuel inlet port 28, the fuel outlet port 30, and the contaminant outlet port 34. As shown in FIG. 7, which is a cross sectional view of FIG. 6, taken between and in the direction of arrows VII—VII, body portion 118 includes a threaded bore 119 for threadably receiving the first end 88 of tubular member 86, which has complementary threads 120, and a larger threaded bore 122 for receiving a first end portion 124 of an insert member 126 having complementary threads 128. A second end portion 130 of insert member 126, having threads 132, functions as the depending boss 52 of the diagrammatic embodiment shown in FIG. 2. Threaded bores 119 and 122 are coaxial about an axis 46', which is coaxial with longitudinal axis 46 of fuel filter cartridge 18. FIG. 7 also clearly shows air bleed passageway 104 intersecting fluid flow passageway 102.

Figure 9:
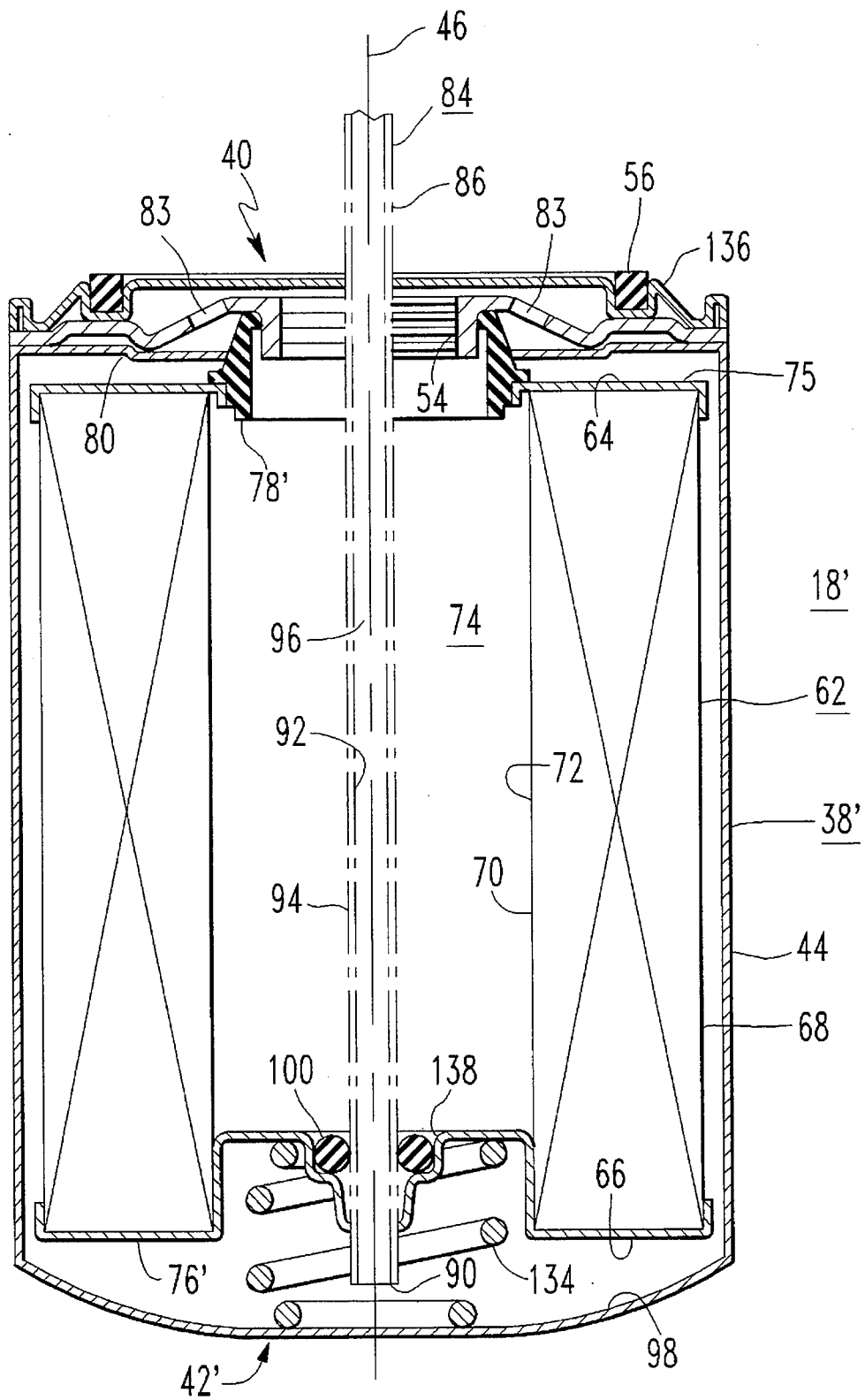
FIG. 9 is a cross sectional view of a fuel filter cartridge constructed according to a preferred embodiment of the invention, which may be used for the fuel filter cartridge shown diagrammatically in FIG. 2.

FIG. 9 is a cross sectional view of a fuel filter cartridge 18', illustrating a preferred embodiment of the fuel filter cartridge 18 shown diagrammatically in FIG. 2. Components of the preferred embodiment of fuel filter head cartridge 18' which are the same as the components already described relative to the diagrammatic embodiment of fuel filter cartridge 18 will be identified with like reference numbers. Similar but modified components will be identified with like reference numbers with the addition of a prime mark.

Differences include a spring element 134 disposed between the lower end cap 76' and the filter element 62 to bias the filter element towards the first end 40, and a support element 136 for annular seal member 56. The lower end cap 76' forms a seat 138 for supporting and locating annular seal member 100.

I claim:

1. A fuel filter system for conditioning fuel flowing from fuel supply means to an internal combustion engine via a fuel flow path which includes pumping means, comprising:

fuel conditioning means including a fuel filter head and a fuel filter cartridge having a filter element, said cartridge having opposed upper and lower ends;

said fuel filter head having fuel inlet and fuel outlet ports respectively adapted for connection in the fuel flow path between the fuel supply means and the internal combustion engine, means for releaseably securing the upper end of said fuel filter cartridge to the fuel filter head, and to cooperatively define fuel inlet and fuel outlet chambers between said filter head and said cartridge, inlet passage means for fluidly connecting said fuel inlet port to said fuel inlet chamber, and outlet passage means for fluidly connecting said fuel outlet port to said fuel outlet chamber, whereby fuel is directed from the fuel inlet port and fuel inlet chamber through the filter element to the fuel outlet chamber and fuel outlet port of the fuel filter head, while separating water and other fuel contaminants from the fuel;

said fuel filter head defining a contaminant outlet port, a collection means disposed external to said fuel conditioning means;

means connecting said contaminant outlet port in continuous fluid flow communication with said collection means, with said collection means being at a lower pressure than said fuel conditioning means during operation of the internal combustion engine;

bleed tube means having first and second ends;

said filter head defining first fluid flow path means for connecting said first end of the bleed tube means in fluid flow communication with said contaminant outlet port;

said second end of the bleed tube means being located within the fuel inlet chamber of the fuel filter cartridge adjacent said lower end where water and other fuel contaminants separated from the fuel tend to collect, to continuously force water and other fuel contaminants to be delivered to said collection means via the contaminant outlet port during operation of the internal combustion engine;

and a second fluid flow path means defined by said fuel filter head which interconnects a portion of said fuel inlet chamber adjacent said filter head with said contaminant outlet port, forcing air in the fuel inlet chamber to flow to said collection means via the contaminant outlet port during operation of the internal combustion engine.

2. The fuel filter system of claim 1 wherein the bleed tube means includes an elongated tubular member carried by the fuel filter head, and annular sealing means disposed within and carried by the fuel filter cartridge, with said elongated tubular member extending through said annular sealing means when the fuel filter cartridge is releasably secured to the fuel filter head, such that said annular sealing means sealingly engages said elongated tubular member.

3. The fuel filter system of claim 1 wherein the first and second fluid flow path means intersect one another within the fuel filter head and are dimensioned to restrict the rate at which fluid is delivered to the contaminant outlet port, to provide a positive supply pressure of filtered fuel at the fuel outlet port of the fuel filter head.

4. The fuel filter system of claim 1 wherein the collection means includes the fuel supply means, to return fluid and solid contaminants flowing through the contaminant outlet port to the fuel supply means.

5. The fuel filter system of claim 1 wherein the fuel filter cartridge defines a cylindrical configuration having first and second longitudinal ends and a longitudinal axis which extends between the first and second ends, with the bleed tube means having inner and outer surfaces which extend between the first and second ends, said bleed tube means being disposed coaxial with the longitudinal axis of the filter cartridge, and including sealing means in the filter cartridge which sealingly engages the outer surface of the bleed tube means.

6. The fuel filter system of claim 5 wherein the sealing means is disposed adjacent to the second end of the bleed tube means.

7. The fuel filter system of claim 5 wherein the second end of the bleed tube means is disposed adjacent to the lower end of the filter cartridge, and the sealing means is disposed adjacent to the second end of the bleed tube means.

8. The fuel filter system of claim 1 including orifice means disposed to restrict the rate at which fluid is delivered to the contaminant outlet port, with the orifice means being dimensioned to provide a positive supply pressure of filtered fuel at the fuel outlet port of the fuel filter head.

9. A fuel filter head for mounting a fuel filter comprising:

a mounting member having a portion adapted to releasably receive a fuel filter cartridge in a fuel conditioning system, said mounting member including fuel inlet and fuel outlet ports respectively adapted for connection to fuel supply means and an internal combustion engine, said portion including means for releasably securing said fuel filter cartridge to the fuel filter head, and to cooperatively define fuel inlet and fuel outlet chambers between said filter head and said cartridge;

said member including inlet passage means for fluidly connecting said fuel inlet port to said fuel inlet chamber, and outlet passage means for fluidly connecting said fuel outlet port to said fuel outlet chamber, whereby fuel is directed from the fuel inlet port and fuel inlet chamber through the filter element to the fuel outlet chamber and fuel outlet port of the fuel filter head, while separating water and other fuel contaminants from the fuel;

bleed tube means fixed to the mounting member;

a contaminant outlet port on the mounting member;

said bleed tube means being positioned to enter the fuel inlet chamber of said fuel filter cartridge when the fuel filter cartridge is assembled with the mounting member, said bleed tube means being dimensioned such that when the fuel filter cartridge is assembled with the mounting member the bleed tube means defines a fluid flow path through which water and other impurities in the fuel are continuously delivered to the contaminant outlet port of the mounting member during operation of the internal combustion engine, said mounting member defining first and second passageways, with said first passageway connecting the bleed tube means in fluid flow communication with the contaminant outlet port, and with said second passageway interconnecting a portion of the fuel inlet chamber adjacent the mounting member in fluid flow communication with the contaminant outlet port, with said portion of the mounting member being in fluid flow communication with air separated from fuel flowing through the mounting member, whereby air separated from fuel is continuously delivered to the contaminant outlet port during operation of the internal combustion engine.

10. The fuel filter head of claim 9 wherein the contaminant outlet port of the mounting member is adapted for connection to the fuel supply means, to return fluid and solid contaminants flowing through the first and second passageways to the fuel supply means.

11. The fuel filter head of claim 9 wherein the bleed tube means includes a tubular member having first and second ends and a longitudinal axis which extends between said first and second ends, with said first end being fixed to the mounting member, with said tubular member being dimensioned between said first and second ends to extend for a predetermined dimension into a fuel filter cartridge, when a fuel filter cartridge is assembled with the mounting member.

12. The fuel filter head of claim 9 wherein the first and second passageways are dimensioned to restrict the rate at which fluid is delivered to the contaminant outlet port, to provide a positive supply pressure of filtered fuel at the fuel outlet port of the mounting member.

13. The fuel filter system of claim 9 including orifice means disposed to restrict the rate at which fluid is delivered to the contaminant outlet port, with the orifice means being dimensioned to provide a positive supply pressure of filtered fuel at the fuel outlet port of the mounting member.

* * * * *